United States Patent
Pancholi et al.

(10) Patent No.: US 11,438,408 B2
(45) Date of Patent: Sep. 6, 2022

(54) TRANSFERRING APPLICATIONS FROM OVERUTILIZED ARRAYS OF COMPUTER SYSTEMS TO UNDERUTILIZED ARRAYS OF COMPUTER SYSTEMS

(71) Applicant: EMC IP Holding Company LLC, Hopkinton, MA (US)

(72) Inventors: Ashish Arvindbhai Pancholi, Cary, NC (US); Bina K. Thakkar, Cary, NC (US); David C. Waser, Holly Springs, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/153,621

(22) Filed: Jan. 20, 2021

(65) Prior Publication Data

US 2022/0232067 A1    Jul. 21, 2022

(51) Int. Cl.
*H04L 67/1008*   (2022.01)
*H04L 67/148*    (2022.01)
*H04L 67/1029*   (2022.01)
*H04L 67/1027*   (2022.01)

(52) U.S. Cl.
CPC ...... *H04L 67/1008* (2013.01); *H04L 67/1027* (2013.01); *H04L 67/1029* (2013.01); *H04L 67/148* (2013.01)

(58) Field of Classification Search
CPC ............ H04L 67/1008; H04L 67/1027; H04L 67/1029; H04L 67/148
See application file for complete search history.

(56) References Cited

U.S. PATENT DOCUMENTS

| | | | |
|---|---|---|---|
| 2017/0012892 A1* | 1/2017 | Zhang | G06F 9/5061 |
| 2017/0104789 A1* | 4/2017 | Cudak | H04L 67/10 |
| 2017/0295246 A1* | 10/2017 | Georgiou | H04L 67/148 |
| 2018/0121110 A1* | 5/2018 | Sawhney | G06F 3/067 |
| 2020/0004582 A1* | 1/2020 | Fornash | H04L 67/1097 |
| 2020/0117494 A1* | 4/2020 | Cortez | G06N 5/02 |
| 2020/0267216 A1* | 8/2020 | Haggart | H04L 67/1097 |
| 2021/0184916 A1* | 6/2021 | Ramanujan | G06F 11/3466 |

* cited by examiner

*Primary Examiner* — Ryan J Jakovac
(74) *Attorney, Agent, or Firm* — Amin, Turocy & Watson, LLP

(57) ABSTRACT

Transferring a workload among computing devices is described. For instance, a system can comprise a first device with a memory that stores computer executable components and a processor that executes the computer executable components stored in the memory. In an example implementation, a transfer instruction receiving component can receive a transfer instruction from a second device, with the transfer instruction being generated based on a first utilization characteristic assigned to the first device and a second utilization characteristic assigned to a third device. In one or more embodiments, the first utilization characteristic can be based on a workload to provide a service to a client device served by the first device, and the second utilization characteristic can be based on measure of available workload processing capacity for the third device.

20 Claims, 10 Drawing Sheets

400

800 ⟶

802
ASSIGNING DETERMINED UTILIZATION CHARACTERISTICS TO RESPECTIVE ONES OF A GROUP OF LINKED NETWORK DEVICES, WHEREIN A FIRST UTILIZATION CHARACTERISTIC OF THE DETERMINED UTILIZATION CHARACTERISTICS IS ASSIGNED TO A FIRST NETWORK DEVICE AND A SECOND UTILIZATION CHARACTERISTIC OF THE DETERMINED UTILIZATION CHARACTERISTICS IS ASSIGNED TO A SECOND NETWORK DEVICE OF THE GROUP OF LINKED NETWORK DEVICES, AND WHEREIN THE FIRST NETWORK DEVICE HANDLES A WORKLOAD TO PROVIDE A SERVICE TO A CLIENT DEVICE SERVED BY THE FIRST NETWORK DEVICE

UTILIZATION CHARACTERISTIC DETERMINING COMPONENT 122

804
BASED ON THE FIRST UTILIZATION CHARACTERISTIC, IDENTIFYING THE FIRST NETWORK DEVICE AS A SOURCE NETWORK DEVICE, WHEREIN THE FIRST UTILIZATION CHARACTERISTIC DESCRIBES A MAGNITUDE OF THE WORKLOAD

WORKLOAD PROCESSING COMPONENT 124

806
MAPPING A TRANSFER OF THE WORKLOAD TO THE SECOND NETWORK DEVICE, WHEREIN THE SECOND NETWORK DEVICE WAS SELECTED AS A DESTINATION DEVICE FOR THE WORKLOAD BASED ON THE SECOND UTILIZATION CHARACTERISTIC AND A STABILITY CHARACTERISTIC OF THE SECOND NETWORK DEVICE

WORKLOAD TRANSFER MAPPING COMPONENT 126

FIG. 8

TRANSFERRING APPLICATIONS FROM OVERUTILIZED ARRAYS OF COMPUTER SYSTEMS TO UNDERUTILIZED ARRAYS OF COMPUTER SYSTEMS

TECHNICAL FIELD

The subject application generally relates to computer applications, and, for example, to adjusting processing load across arrays of systems, and related embodiments.

BACKGROUND

As the processing of data by organizations continues to increase, modern processing solutions can incorporate different approaches to handling applications, including the use of arrays of processing systems across sites and the enterprise. Benefits of these processing arrays is an increase in the performance that can be realized based on concurrent operation of the systems, e.g., lower latency. Another benefit involves fault tolerance, e.g., individual systems can fail without affecting the entire system.

In some circumstances, conventional approaches to handling applications with arrays of systems can have problems with underutilization and overutilization of different arrays. Solving this problem can be difficult because underutilized arrays that are capable of handling additional processing can have different characteristics, with some arrays being less likely to have short and longer-term problems handling more processing tasks.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a first device with a memory that stores computer executable components and a processor that executes the computer executable components stored in the memory. In an example implementation, a transfer instruction receiving component can receive a transfer instruction from a second device, with the transfer instruction being generated based on a first utilization characteristic assigned to the first device and a second utilization characteristic assigned to a third device. In one or more embodiments, the first utilization characteristic can be based on a workload to provide a service to a client device served by the first device, and the second utilization characteristic can be based on measure of available workload processing capacity for the third device.

In one or more embodiments, a workload transfer component can, based on the transfer instruction, transfer the workload to the third device, with the third device being selected to receive the workload based on the second utilization characteristic and a stability characteristic of the second device. In one or more embodiments, the stability characteristic can be based on a version of an application that provides the service by the second device. In a variation, the stability characteristic can be based on a likelihood of a failure of a component of the second device that would affect providing the service by the second device.

In one or more embodiments, the first utilization characteristic can be based on a group of factors, including, but not limited to, processor utilization and a rate of input output operations. In an example embodiment, the second device can be selected to receive the workload based on the second utilization characteristic indicating that the second device is in an underutilized state. One or more additional embodiments can provide a method that includes assigning, by a system comprising a processor, determined utilization characteristics to respective ones of a group of linked network devices. In an embodiment, the group of linked devices can be a part of a unified storage system array.

In an example, implementation, a first utilization characteristic of the determined utilization characteristics can be assigned to a first network device and a second utilization characteristic of the determined utilization characteristics can be assigned to a second network device of the group of linked network devices, with the first network device handing a workload to provide a service to a client device served by the first network device.

In additional embodiments, the method can further include, a based on the first utilization characteristic, identifying, by the system, the first network device as a source network device, with the first utilization characteristic describes a magnitude of the workload. In additional variations, the method can include mapping, by the system, a transfer of the workload to the second network device, with the second network device being selected as a destination device for the workload based on the second utilization characteristic and a stability characteristic of the second network device. Based on the mapping, some embodiments can facilitate transferring, by the system, the workload to the destination device.

In alternative or additional embodiments, the stability characteristic can be based on a likelihood of a failure of a component of the second network device with an impact on providing the service to the client device. In some embodiments, likelihood of a failure can be based on a version of an application that provides the service, e.g., the application provided to a client device.

In some embodiments, the first network device can be identified as the source network device based on the first utilization characteristic indicating that the first network device is in an overutilized state from handling the workload. In one or more embodiments of the method, the utilization characteristic can be based on factors including, but not limited to, processor utilization and a rate of input output operations. In some embodiments, the utilization characteristics can be analyzed for the workload based on results of analysis of other workloads. In one or more embodiments, the first utilization characteristic can be based on an extent to which the service provided accesses stored service data sequentially.

In embodiments of the method, the second network device can be identified as the destination device based on the second utilization characteristic indicating that the second network device is in an underutilized state. In some embodiments, the destination device can provide an alternate location for providing the service to the client device. In one or more embodiments, the second network device can be identified as the destination device based on a measure of latency for communications with the client device.

Additional embodiments can comprise a machine-readable storage medium comprising executable instructions that, when executed by a processor of a first computing device, facilitate performance of operations, the operations comprising assigning obtained utilization characteristics to respective ones of a group of linked network devices, wherein a first utilization characteristic of the obtained utilization characteristics is assigned to a first network device and a second utilization characteristic of the obtained utilization characteristics is assigned to a second network device of the group of linked network devices, and wherein the first network device handles a workload to provide a service to a client device served by the first network device.

In additional embodiments, executable instructions can further include, based on the first utilization characteristic, identifying the first network device as a source network device, with the first utilization characteristic generally describing a magnitude of the workload. In additional embodiments, executable instructions can further include transferring the workload to the second network device, with the second network device being selected as a destination device for the workload based on the second utilization characteristic and a stability characteristic of the second network device.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which:

FIG. 8 is a flow diagram representing example operations of an example system 800 comprising utilization characteristic determining component, workload processing component, and workload transfer mapping component that can facilitate transferring workload among computing devices, in accordance with one or more embodiments.

DETAILED DESCRIPTION

Various aspects described herein are generally directed towards facilitating transferring workload among computing devices, in accordance with one or more embodiments. As will be understood, the implementation(s) described herein are non-limiting examples, and variations to the technology can be implemented.

Reference throughout this specification to "one embodiment," "one or more embodiments," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein can employ hardware and/or software to solve problems that are highly technical in nature (e.g., rapid determination and dissemination of distributed system state information, as well as the synchronizing of processes), that are not abstract and cannot be performed as a set of mental acts by a human. For example, a human, or even a plurality of humans, cannot efficiently, accurately and effectively, collect, encode, and transfer state information for the nodes of a distributed system, with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
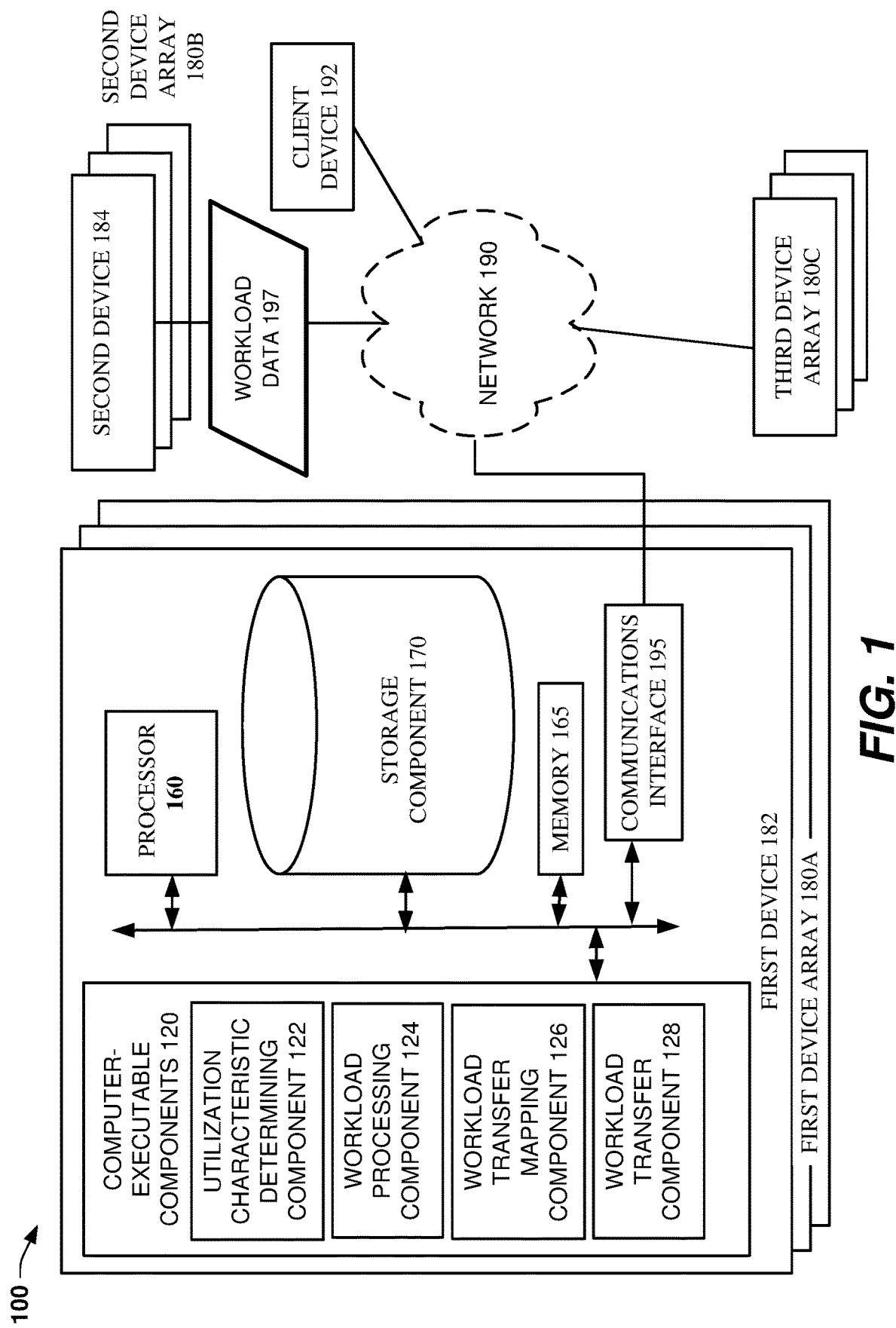
FIG. 1 illustrates a block diagram of an example, non-limiting system that can facilitate transferring workload among computing devices, in accordance with various aspects and implementations of the subject disclosure.

FIG. 1 illustrates a block diagram of an example, non-limiting system 100 that can facilitate transferring workload among computing devices, in accordance with various aspects and implementations of the subject disclosure. Repetitive description of like elements and/or processes employed in respective embodiments is omitted for sake of brevity.

System 100 can include first device 182 of first device array 180A communicatively coupled to second device array 180B and third device array 180C via network 190. First device 182 can include computer-executable components 120, processor 160, storage component 170, memory 165, and communications interface 195. Storage component 170 can include shared file state 175. Examples of network 190 that can be used by one or more embodiments are discussed with FIGS. 9 and 10 below. As depicted, second device array 180B transfers workload data 197 to network 190 for allocation to third device array 180C. In one or more embodiments, workload data 197 can comprise an application utilized by client device 192.

As will be understood, the implementation(s) described herein are non-limiting examples, and variations to the technology can be implemented. For instance, even though examples described herein are executed on arrays of linked computing devices, different approaches can work with individual computing devices as well. As such, any of the embodiments, aspects, concepts, structures, functionalities, implementations and/or examples described herein are non-limiting, and the technology may be used in various ways that provide benefits and advantages in distributed systems technology in general, both for existing technologies and technologies in this area that are yet to be developed.

In one or more embodiments, system 100 can comprise memory 165 that can store computer executable components, and processor 160 that can execute the computer executable components stored in the memory. As discussed further below with FIG. 10, in some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1016 and FIG. 10. Such examples of memory 165 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like.

Computer-executable components 120 can include utilization characteristic determining component 122, workload processing component 124, workload transfer mapping component 126, workload transfer component 128, and other components described or suggested by one or more embodiments discussed herein. For example, in one or more embodiments, memory 165 can store computer-executable components 120 that, when executed by processor 160, can facilitate performance of operations described further herein.

As described in some examples below, an example system that can benefit in some circumstances from the use of one or more embodiments is a system that can facilitate transferring workload among computing devices, workload of applications served to client device 192, e.g., file storage applications and database applications. In some implementations, workload data 197 can be associated with a file storage application of a file storage system that implements a data protection system. In different implementations, data protection systems can benefit from the flexible expansion that one or more embodiments can facilitate, e.g., adding additional workload processing capacity with additional computing devices that can be included in the shared state described herein.

Example data protection systems which can employ one or more of the approaches described with embodiments herein include, but are not limited to storage as a service applications, e.g., STAAS provided by DELL EMC, Inc.

Example storage array devices which can employ one or more of the approaches described with embodiments herein include, but are not limited to, POWERMAX ENTERPRISE DATA STORAGE ARRAY SYSTEM provided by DELL EMC, Inc. In one or more embodiments, devices discussed herein can be linked in a unified storage system array.

As described further below, in one or more embodiments, a source array under load can be identified using different approaches, including, but not limited to, monitoring and statistical calculations. Once an overutilized source array is identified, underutilized destination arrays are identified and selected for use, based on different approaches, including, but not limited to, a scoring technique, with a machine learning algorithm.

As will be understood, the implementation(s) described herein are non-limiting examples, and variations to the technology can be implemented. For instance, even though examples described herein where overutilized arrays can be identified and application hosting can be transferred to alternative device arrays. As such, any of the embodiments, aspects, concepts, structures, functionalities, implementations and/or examples described herein are non-limiting, and the technology may be used in various ways that provide benefits and advantages in distributed systems technology in general, both for existing technologies and technologies in this area that are yet to be developed.

Figure 2:
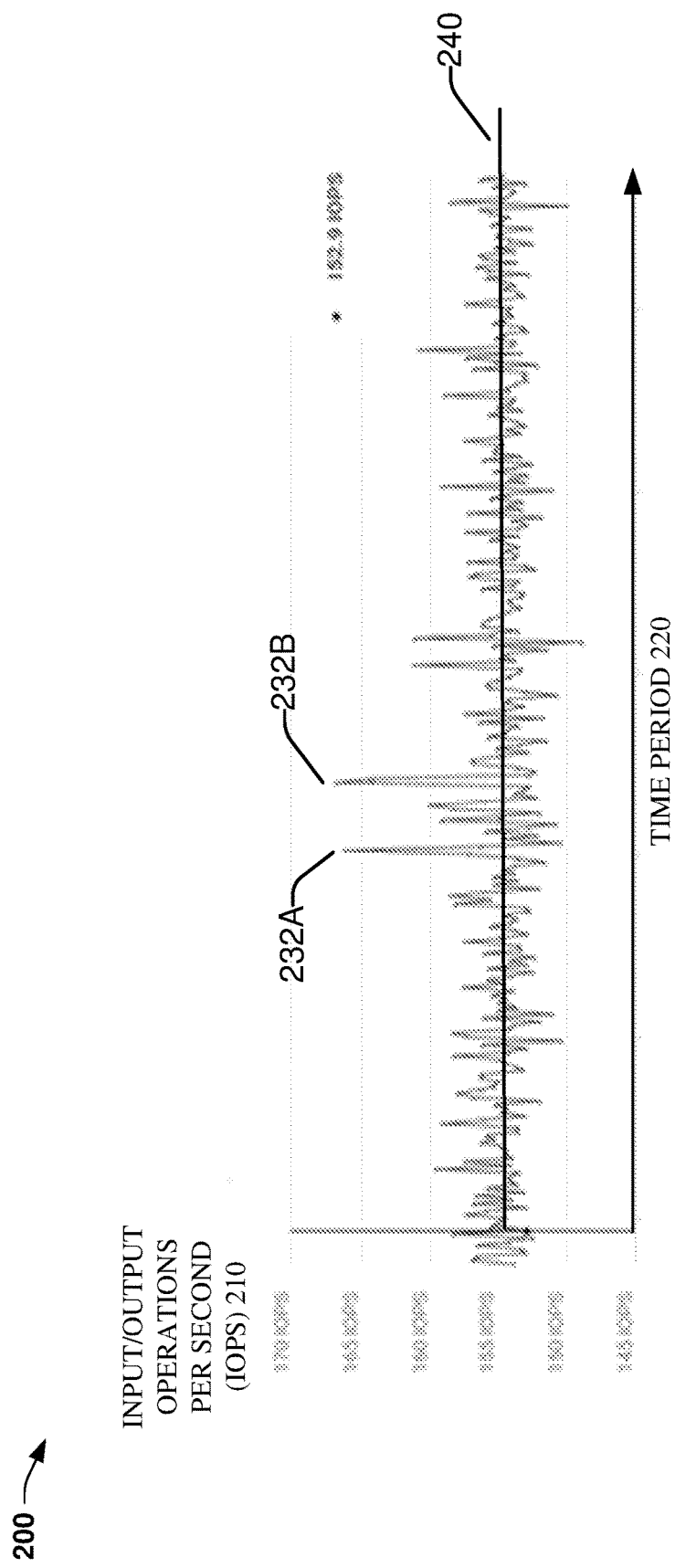
FIG. 2 illustrates a chart that illustrates aspects of the detection of underutilized and overutilized systems, in accordance with one or more embodiments.

FIG. 2 illustrates a chart 200 that illustrates aspects of the detection of underutilized and overutilized systems, in accordance with one or more embodiments. Repetitive description of like elements and/or processes employed in respective embodiments is omitted for sake of brevity. As depicted, chart 200 includes input/output operations per second (IOPS) 210 on a Y-axis and time period 220 on an X-axis. Of the charted points, peak utilization points 232A-B are labels, and average line 240 indicates an average IOPS over time period 220.

Thus, returning to the elements of FIG. 1, in one or more embodiments, a system comprising a processor, can assign determined utilization characteristics to respective ones of a group of linked network devices. For example, first device 182 can determine utilization characteristics for second device array 180B and third device array 180C. Generally speaking, as discussed further below, one or more embodiments can use a variety of data sets including existing capacity metrics, performance metrics (utilization, etc.), tier data, and configuration information for different device arrays.

In one or more embodiments, utilization characteristics can include, but is not limited to, data from operation of respective device arrays (e.g., device arrays 180B-C) can be collected and analyzed to detect different aspects of the load under which the device array is operating. For example, in a non-limiting example, an array under load can be identified by performing statistical analysis for system utilization metrics using data from the last number of days (e.g., 7, 21, 30, and 90, in some examples), with the data being averaged for each day to get a long term utilization pattern for the system, e.g., a magnitude of the workload. This long term utilization pattern can be compared to a threshold of usage, e.g., to determine whether the array is overutilized.

As an alternative factor, measurement of load on drive storage devices (e.g., storage component 170) can be compared to a threshold, e.g., by measuring and analyzing input/outputs per second (IOPS) 210 for a period of time similar to that discussed above with utilization, discussed above. In additional or alternative embodiments, factors associated with the access of workload data 197 from second device array 180B can be evaluated when determining the utilization characteristics of the array. Aspects of some of the data access factors that can be utilized by one or more embodiments are discussed with FIG. 4 below.

In additional embodiments, array utilizations, IOPS, and other metrics can be combined to determine whether a system is overutilized. An example combination that can be used by one or more embodiment includes a threshold where more than 80% of processing utilization and 80% of disk IOPS are under load. In this example, second device array 180B can be operating an application that produces workload data 197 for client device 192.

Continuing the example from FIG. 1, first device 182 can assign the determined utilization characteristics to respective device arrays 180B-C. For second device array 180B, for this example, the utilization characteristics (e.g., as described above) can facilitate the identifying by first device 182, of second device array 180B as a source network device, e.g., an overloaded array from which an application can be transferred to a destination network device. In one or more embodiments, this transfer can be facilitated by a mapping by system device 182 of a transfer of the workload from second device array 180B to a destination device.

As noted above, third device array 180C can be selected as a destination device by one or more embodiments based on determined utilization characteristics of third device array 180C. In a variation of this approach, additional factors can be included in the criteria used to evaluate destination devices for the workload from second device array 180B. These additional factors can include, but are not limited to a stability characteristic of third device array 180C, e.g., a likelihood of failure for the device array over a future term. The selection of destination devices, including aspects of stability characteristics of device arrays, are discussed further below with FIG. 4.

Figure 3:
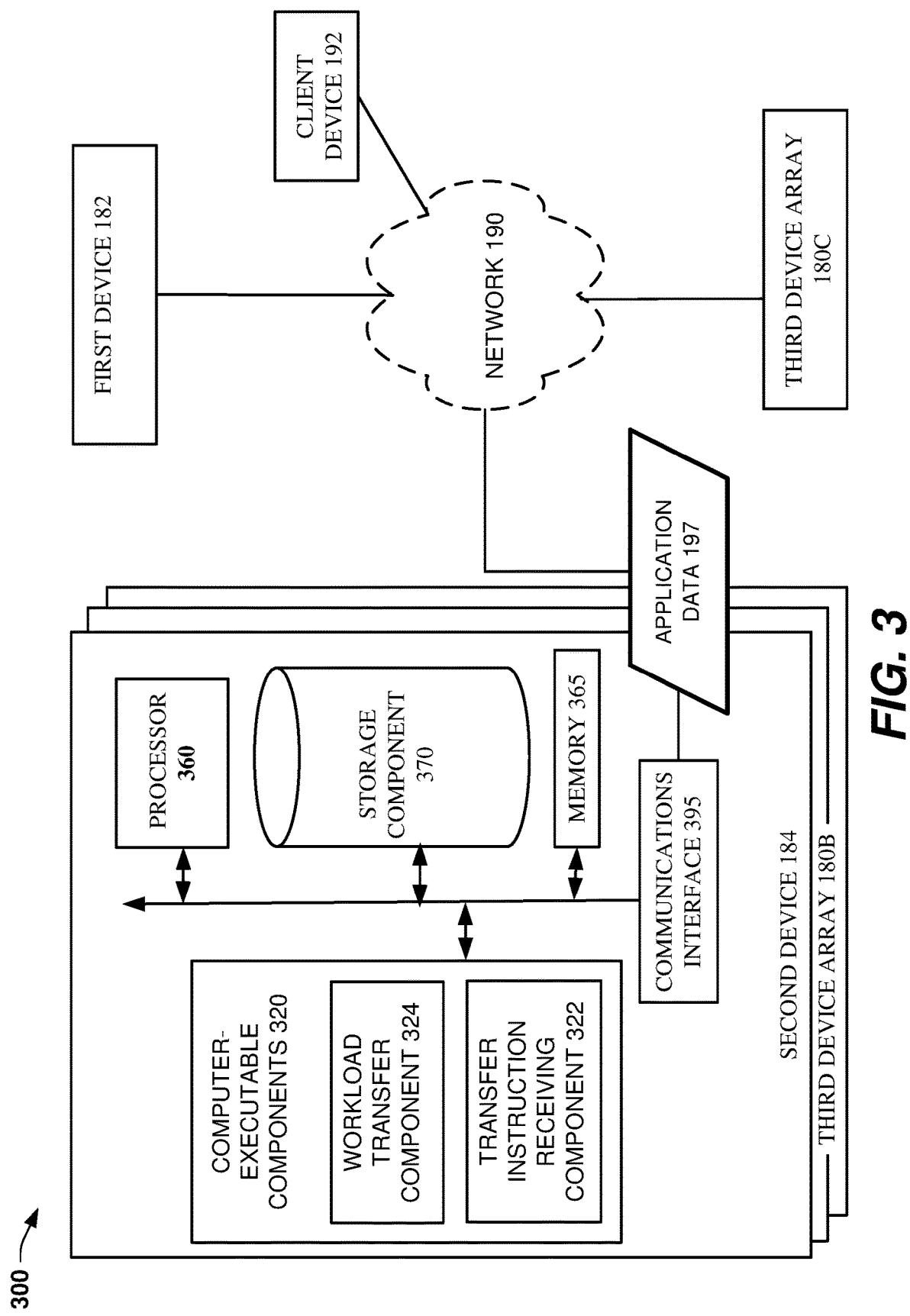
FIG. 3 illustrates a block diagram of an example, a second device of non-limiting system that can facilitate transferring workload among computing devices, in accordance with various aspects and implementations of the subject disclosure.

FIG. 3 illustrates a block diagram of an example, a second device 184 of non-limiting system 300 that can facilitate transferring workload among computing devices, in accordance with various aspects and implementations of the subject disclosure. Repetitive description of like elements and/or processes employed in respective embodiments is omitted for sake of brevity.

System 300 can include first device 182 communicatively coupled to second device array 180B and third device array 180C via network 190, as discussed above with FIG. 1. Second device array 180B, depicted in FIG. 3 in more detail, can include computer-executable components 320, processor 360, storage component 370, memory 365, and communications interface 395. Storage component 170 can include shared file state 175. As depicted, second device 184 can transfer workload data 197 to network 190 for allocation to third device array 180C. In one or more embodiments, workload data 197 can comprise an application utilized by client device 192.

In one or more embodiments, system 100 can comprise memory 165 that can store computer executable components, and processor 160 that can execute the computer executable components stored in the memory. As discussed further below with FIG. 10, in some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1016 and FIG. 10. Such examples of memory 165 can be employed to implement any embodiments of the subject disclosure.

According to multiple embodiments, processor 160 can comprise one or more types of processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like.

Computer-executable components 120 can include utilization characteristic determining component 122, workload processing component 124, workload transfer mapping component 126, workload transfer component 128, and other components described or suggested by one or more embodiments discussed herein. For example, in one or more embodiments, memory 165 can store computer-executable components 120 that, when executed by processor 160, can facilitate performance of operations described further herein.

In some embodiments, a transfer instruction receiving component 322 of second device 184 can receive a transfer instruction from first device 182, with the transfer instruction being generated as described with FIG. 1, based on a first utilization characteristic assigned to source second device array 180B and a second utilization characteristic assigned to third device array 180C. As discussed with FIG. 1 above, the first utilization characteristic can be based on a workload for second device 184 to provide a service to client device 192, and the second utilization characteristic can be based on measure of available workload processing capacity for the third device array 180C, e.g., discussed with FIGS. 4-6.

In one or more embodiments workload transfer component 324 of a source second device 184 can, based on the transfer instruction received, transfer the workload to a destination device, with the destination device being selected to receive the workload based on utilization characteristics of candidate destination devices and a stability characteristic of the second device, e.g., discussed with FIGS. 4-5 below.

Figure 4:
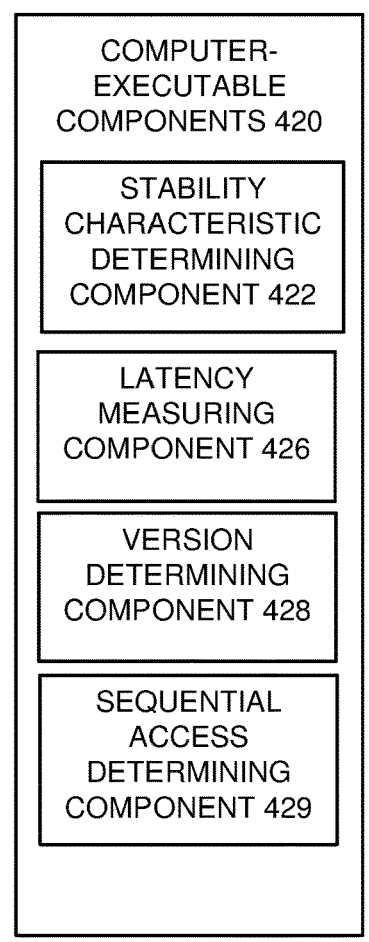
FIG. 4 illustrates an example of computer executable components that can be used to implement some aspects of various aspects and implementations of different embodiments of the subject disclosure.

FIG. 4 illustrates an example 400 of computer executable components that can be used to implement some aspects of various aspects and implementations of different embodiments of the subject disclosure. Repetitive description of like elements and/or processes employed in respective embodiments is omitted for sake of brevity.

Example 400 depicts example computer-executable components 420 that can be used by computer devices discussed herein, e.g., similar to computer-executable components 120 of first device 182, discussed above. In one or more embodiments, computer-executable components 420 can include, but are not limited to, stability characteristic determining component 422, latency measuring component 426, version determining component 428, sequential data access determining component 429, and other components described or suggested by one or more embodiments discussed herein.

As noted above, destination devices for workload transfer can be selected by a combination of factors, including utilization characteristics and stability characteristics. To implement an additional feature of some embodiments, latency measuring component 426 can measure the latency between the application selected to be transferred and potential candidate destination systems, e.g., in some circumstances selecting third device array 180C because of a relatively low latency for communications with client device 192.

In one or more embodiments, stability characteristic determining component 422 can generate stability information for candidate destination devices, e.g., third device array 180C and other available arrays. In some implementations, this stability information can be a stability score (e.g., also termed a health score) that can reflect a likelihood that an array of computing devices will experience a failure that could impact the operation of the application to be transferred. One having skill in the relevant art(s), given the disclosure herein, would appreciate different types of available information that can be utilized to generate this estimate.

For example, having versions of software installed at a destination that are not up to most recent versions, so versions of software can be collected and analyzed to incorporate this potential risk into the described stability score. In an example implementation first device 182 can utilize version determining component 428 to determine and analyze version information for operating system software and application software for candidate destination arrays. For example, one scoring approach for versioning can utilize a zero score for use of an old major version of an application, an 80% score for any of the last three minor versions, and 100% for the current major version of application software. As with other factors discussed herein, it should be appreciated that versioning scores can be combined with other factors to select transfer destinations.

In another example, a measure of the quality of hardware elements can also be used, e.g., including, but not limited to, hardware age, maintenance history, record of past failures, and past fixes implemented. One having skill in the relevant art(s), given the description herein would appreciate additional factors that can be considered by embodiments, when determining a stability score for a candidate destination device.

Examples of additional factors that can be considered when evaluating destination devices include, but are not limited to, the type of data access performed by the application. As discussed further with FIG. 5 below, sequential data access determining component 429 can provide information about application data access that can influence the selection of a transfer destination device.

Figure 5:
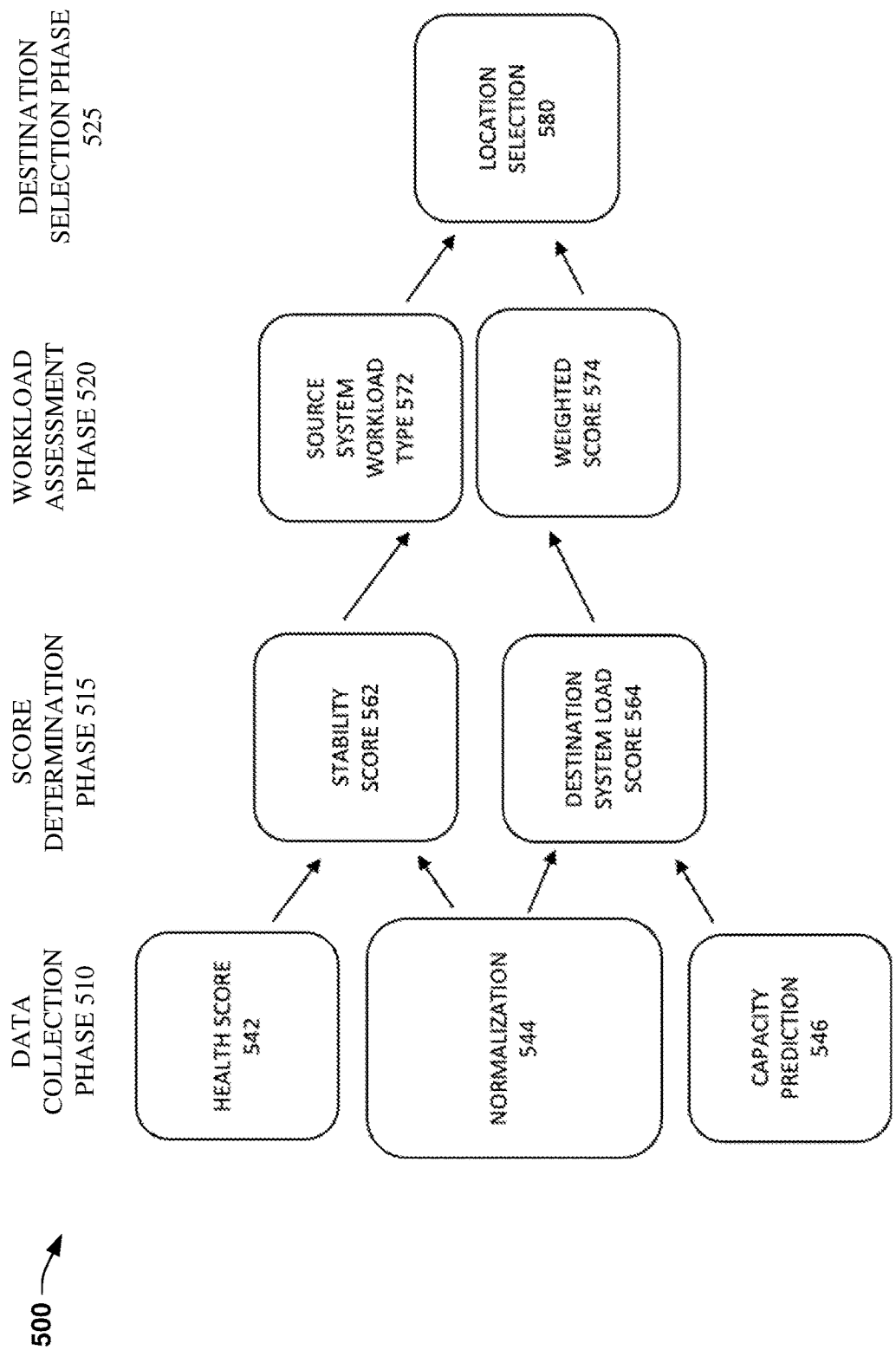
FIG. 5 illustrates a block diagram of a non-limiting, example system 500 that can facilitate selecting a destination system for receiving a transferred workload, in accordance with one or more embodiments.

FIG. 5 illustrates a block diagram of a non-limiting, example system 500 that can facilitate selecting a destination system for receiving a transferred workload, in accordance with one or more embodiments. Repetitive description of like elements and/or processes employed in respective embodiments is omitted for sake of brevity.

System 500 can include different activity blocks for selecting destination devices, e.g., as depicted: data collection phase 510 includes health score 542, normalization 544, and capacity prediction 546, score determination phase 515 includes stability score 562, and destination system load score 564, workload assessment phase 520 includes source system workload type 572, and weight score 574, and destination selection phase 525 include location selection 580, with all of the phases potentially including other activities described or suggested by one or more embodiments discussed herein.

In an example, before data collection phase 510 one or more embodiments can analyze a device array for an application and determine based on utilization characteristics, that the application device array is overutilized. Phases 510, 515, 520, and 525 illustrate an example process for evaluating and selecting from underutilized destinations array for receiving some of the processing load of the overutilized system.

In one or more embodiments, data collection phase 510 can collect and analyze information regarding the potential failure of a candidate system, over time, e.g., termed health score 542 for a device array in some embodiments. As depicted, in normalization 544, different characteristics of candidate devices can be collected and evaluated, e.g., destination version, alerts regarding destination devices, configuration elements of destination devices, processing and storage capacity of candidates, and other relevant metrics that could influence the selection processes described and suggested herein. Based on some of this normalized data, capacity prediction 546 can predict future capacity for candidate destination systems, e.g., over a selected term such as 6 months, for example.

At score determination phase 515, different scores can be determined that reflect the selection factors discussed with FIG. 3 above, e.g., stability score 562 and destination system load score 564. Generally, system load score 564 (also termed LScore herein) can be generated based on the available capacity provided by normalization 544, and capacity prediction 546, e.g., storage and processing. Additional factors that can be used to determine system load score 564 can include, destination performance metrics, e.g., tier data. In some additional embodiments, machine learning can be used to analyze health score 542 and normalization 544 information.

At workload assessment phase 520, the type of workload performed by the overutilized system can be considered by source system workload type 572. Example types include types of storage systems used (e.g., unified storage or file system storage), as well as whether access to workload data 197 of the source system is predominately random-access or sequential. In addition, the combination of both factors can also be utilized to influence the selection of destination devices, e.g., for applications with source device data in a file system, sequentially accessed data can be beneficially identified and persisted in a destination device with a file storage system. For example, in one or more embodiments, a sequential data access workload can be generally be moved to a unified storage array or a file storage array, while one or more embodiments can beneficially move a randomly-accessed workload to a unified storage array.

For weighted score 574, in one or more embodiments, a numeric score can be generated by taking weighted score of system stability score 562 (SScore) and system load score 564 (LScore). For destination selection phase 525, destination location selection 580 can be based SScore, LScore, source system workload type 572, and weighted score 574. For example, a destination score (DScore) can be determined based on the weighted sum of SScore and LScore. In one or more embodiments, the weights applied can be adjusted to emphasize one factor over the other, e.g., DScore=weight1*SScore+weight2*LScore, with a DScore above >0.8 being potential destination storage arrays.

Figure 6:
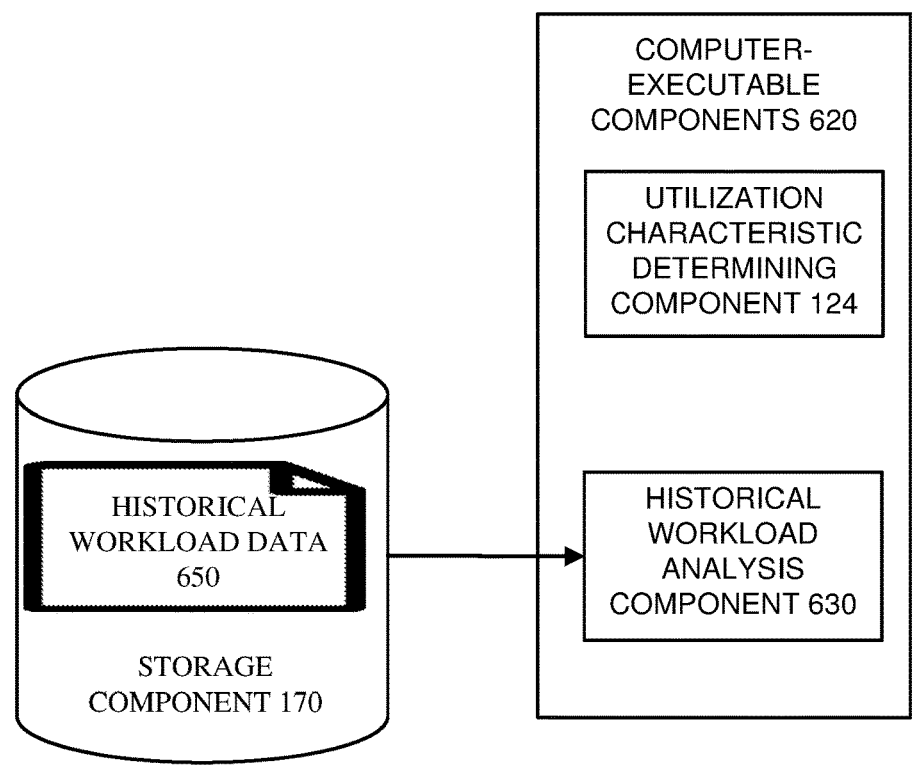
FIG. 6 illustrates a block diagram of a system that can facilitate transferring workload among computing devices, in accordance with one or more embodiments.

FIG. 6 illustrates a block diagram of system 600 that can facilitate transferring workload among computing devices, in accordance with one or more embodiments. Repetitive description of like elements and/or processes employed in respective embodiments is omitted for sake of brevity. FIG. 6 depicts computer executable components 620 coupled to storage component 170. Computer executable components 620 are similar to computer executable components 120 of FIG. 1, and includes utilization characteristic determining component 124 and historical workload analysis component 630, and storage component 170 includes historical workload data 650.

As noted with FIG. 1 above, different utilization characteristics of a source data array can be analyzed to determine whether the array is operating of a period of time in an overutilized state. In one or more additional embodiments, to augment the analysis of utilization characteristics, historical workload analysis component 630 can analyze utilization characteristics based on collected historical workload data 650 for the source system and other similar systems.

Figure 7:
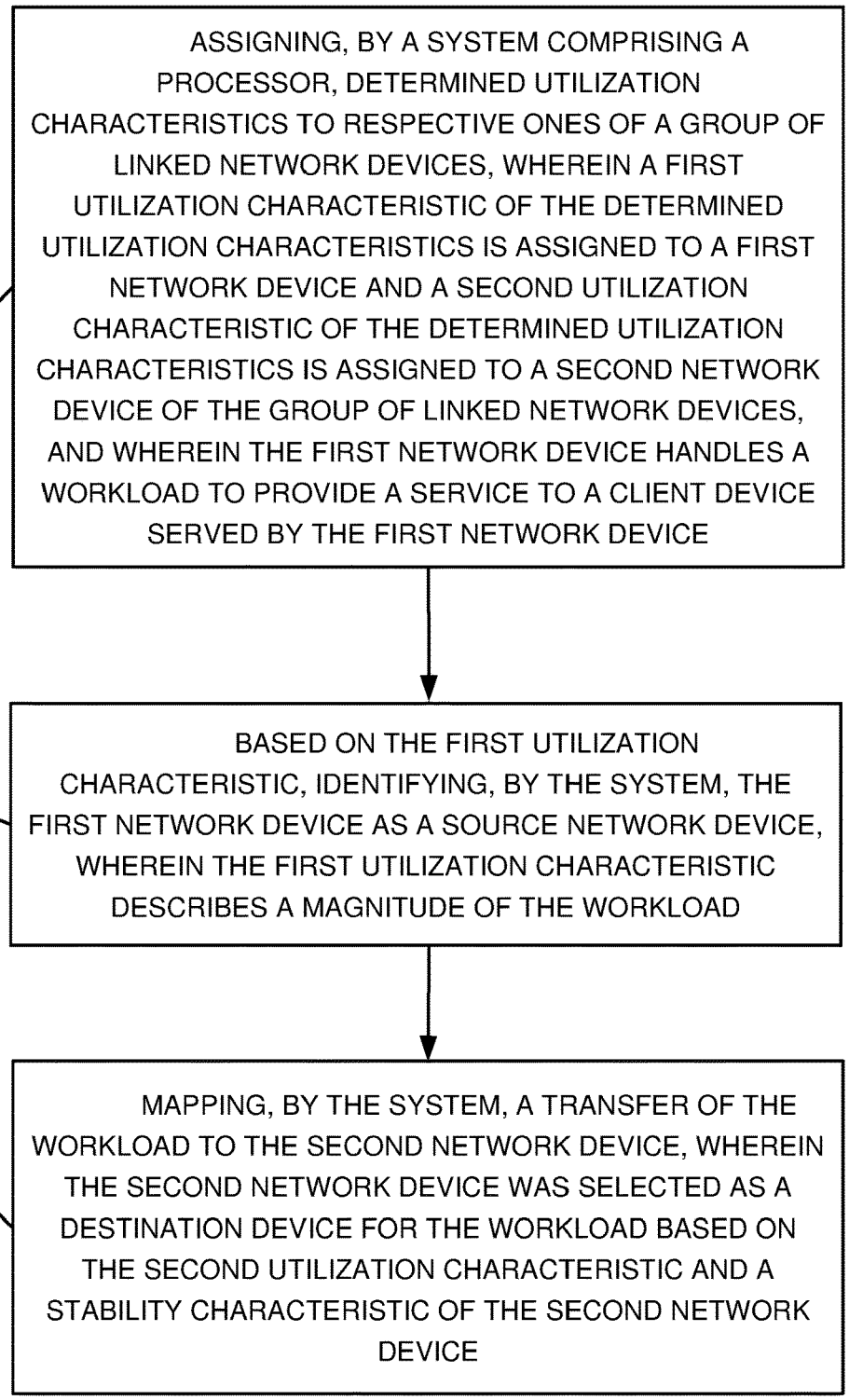
FIG. 7 illustrates an example flow diagram for a method that can facilitate transferring workload among computing devices, in accordance with one or more embodiments.

FIG. 7 illustrates an example flow diagram for a method 700 that can facilitate transferring workload among computing devices, in accordance with one or more embodiments. For purposes of brevity, description of like elements and/or processes employed in other embodiments is omitted.

At element 702, method 700 can comprise assigning, by a system comprising a processor, determined utilization characteristics to respective ones of a group of linked network devices, with a first utilization characteristic of the determined utilization characteristics is assigned to a first network device and a second utilization characteristic of the determined utilization characteristics is assigned to a second network device of the group of linked network devices, and with the first network device handles a workload to provide a service to a client device served by the first network device. For example, in an embodiment, method 700 can assign, by first device 182, comprising processor 160, determined utilization characteristics to respective ones of a group of linked network devices, including third device array 180C, with a first utilization characteristic of the determined utilization characteristics is assigned to second device array 180B device and a second utilization characteristic of the determined utilization characteristics is assigned to third device array 180C of the group of linked network devices, and with second device array 180B handling a workload to provide a service to a client device 192 served by the first network device.

At element 704, method 700 can comprise based on the first utilization characteristic, identifying, by the system, the first network device as a source network device, wherein the first utilization characteristic describes a magnitude of the workload. For example, in an embodiment, method 700 can based on the first utilization characteristic, identifying, by first device 182, the second device array 180B as a source network device, with the first utilization characteristic describing a magnitude of the workload.

At element 706, method 700 can comprise mapping, by the system, a transfer of the workload to the second network device, with the second network device being selected as a destination device for the workload based on the second utilization characteristic and a stability characteristic of the second network device. For example, in one or more embodiments, method 700 can map, by first device 182, a transfer of the workload to third device array 180C, with third device array 180C being selected as a destination device for the workload based on the second utilization characteristic and a stability characteristic of second device array 180B.

FIG. 8 is a flow diagram 800 representing example operations of an example system 800 comprising utilization characteristic determining component 122, workload processing component 124, and workload transfer mapping component 126 that can facilitate transferring workload among computing devices, in accordance with one or more embodiments. For purposes of brevity, description of like elements and/or processes employed in other embodiments is omitted.

Utilization characteristic determining component 122 can be configured 802 to assign determined utilization characteristics to respective ones of a group of linked network devices, with a first utilization characteristic of the determined utilization characteristics being assigned to a first network device and a second utilization characteristic of the determined utilization characteristics is assigned to a second network device of the group of linked network devices, and with the first network device handles a workload to provide a service to a client device served by the first network device.

Workload processing component 124 can be configured 804 to, based on the first utilization characteristic, identify the first network device as a source network device, with the first utilization characteristic describing a magnitude of the workload.

Workload transfer mapping component 126 can be configured 804 to, map a transfer of the workload to the second network device, with the second network device being selected as a destination device for the workload based on the second utilization characteristic and a stability characteristic of the second network device.

Figure 9:
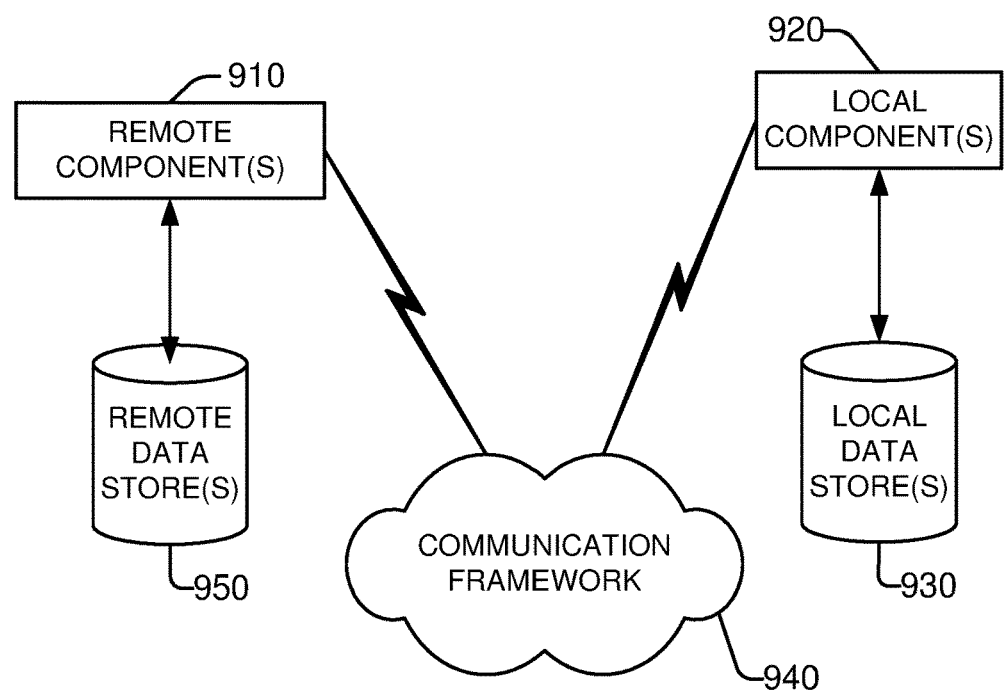
FIG. 9 depicts an example schematic block diagram of a computing environment with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
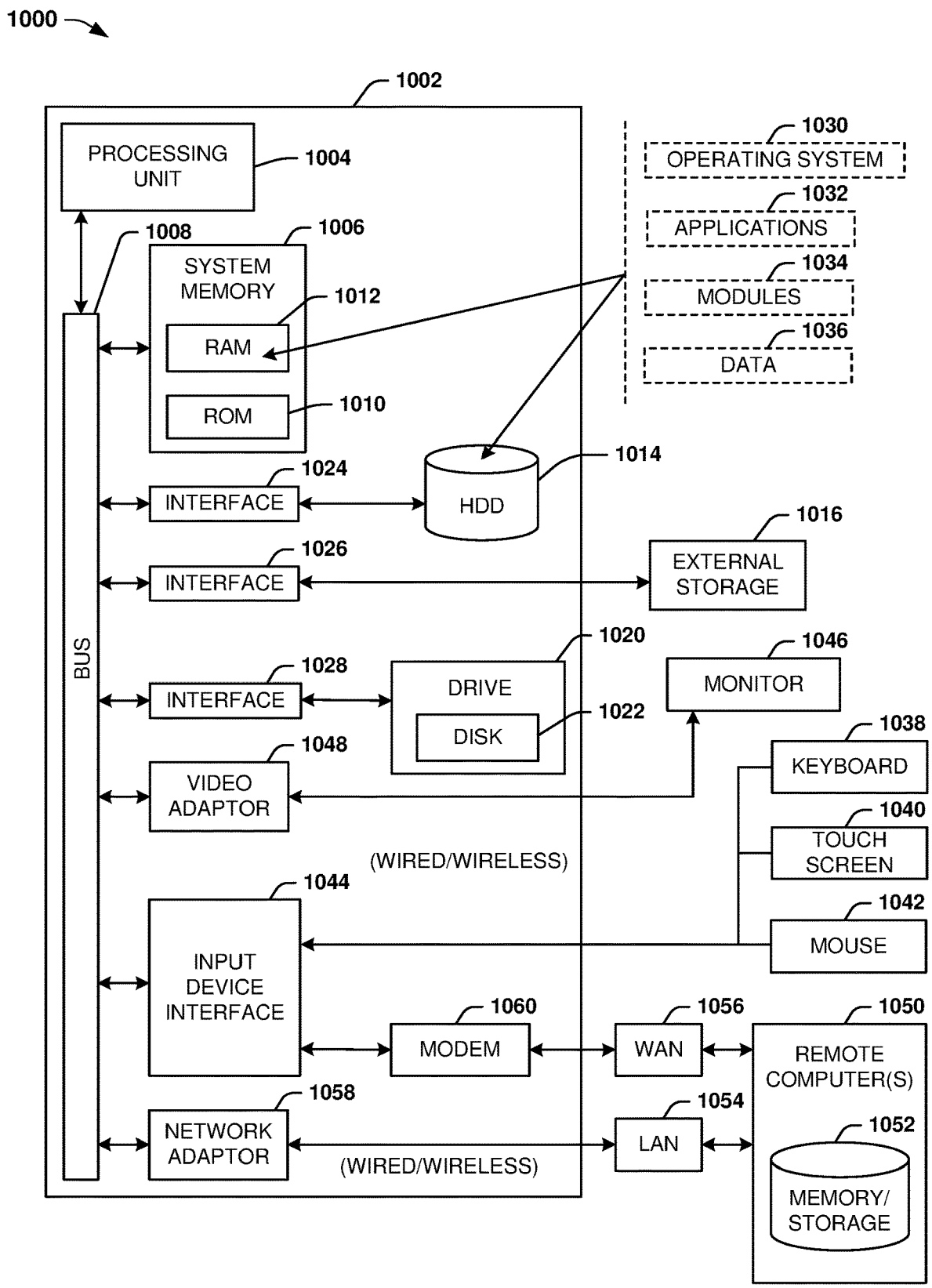
FIG. 10 illustrates an example block diagram of a computing system operable to execute the disclosed systems and methods in accordance with various aspects and implementations of the subject disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. A method, comprising:
   assigning, by a system comprising a processor, determined utilization characteristics to respective ones of a group of linked network devices, wherein first utilization characteristics of the determined utilization characteristics are assigned to a first network device and a second utilization characteristic of the determined utilization characteristics is assigned to a second network device of the group of linked network devices, and wherein the first network device handles a workload to provide a service to a client device served by the first network device;

based on the first utilization characteristics, identifying, by the system, the first network device as a source network device, wherein the first utilization characteristics describe:
a magnitude of the workload, and
an extent to which the service provided accesses stored service data sequentially;

based on a first value corresponding to a first version of an application that enables the service to be provided by the second network device and a second value that corresponds to a second version of the application, generating a version stability score, wherein the second version adds less to the version stability score than the first version according to a significance criterion; and mapping, by the system, a transfer of the workload to the second network device, wherein the second network device was selected as a destination device for the workload based on the second utilization characteristic and a stability characteristic of the second network device, wherein the second network device was selected further based on a predicted future workload processing capacity of the second network device based on a current workload processing capacity of the second network device and the stability characteristic, wherein the stability characteristic comprises the version stability score.

2. The method of claim 1, further comprising, based on the mapping, transferring, by the system, the workload to the destination device.

3. The method of claim 1, wherein the first version comprises a major version of the application and the second version comprises a minor version of the application.

4. The method of claim 1, wherein the stability characteristic is further based on a likelihood of a failure of a component of the second network device with an impact on providing the service by the second network device.

5. The method of claim 1, wherein the first utilization characteristics are based on factors comprising processor utilization and a rate of input output operations.

6. The method of claim 1, wherein the first network device is identified as the source network device based on the first utilization characteristics indicating that the first network device is in an overutilized state from handling the workload.

7. The method of claim 1, wherein the second network device is identified as the destination device based on the second utilization characteristic indicating that the second network device is in an underutilized state.

8. The method of claim 1, wherein the group of linked devices is comprised in a unified storage system array.

9. The method of claim 1, wherein the destination device provides an alternate location for providing the service.

10. The method of claim 1, wherein the utilization characteristics are analyzed for the workload based on results of analysis of other workloads.

11. The method of claim 1, wherein the first utilization characteristics are based on an extent to which the service provided accesses stored service data sequentially.

12. The method of claim 1, wherein the second network device is identified as the destination device based on a measure of latency for communications with the client device.

13. A first device, comprising:
a memory that stores computer executable components; and
a processor that executes the computer executable components stored in the memory, wherein the computer executable components comprise:
a utilization component that communicates to a second device first utilization characteristics for the first device and a second utilization characteristic assigned to a third device;
a transfer instruction receiving component that receives a transfer instruction from the second device, wherein the transfer instruction was generated based on the first utilization characteristic and the second utilization characteristic, wherein the first utilization characteristics were based on a workload to provide a service to a client device served by the first device, and wherein the second utilization characteristic was based on measure of available workload processing capacity for the third device; and
a workload transfer component that, based on the transfer instruction, transfers the workload to the third device, wherein the third device was selected to receive the workload based on:
the second utilization characteristic,
a first stability characteristic of the second device based on a first value corresponding to a version stability score based on a first value corresponding to a first version of an application that enables the service to be provided by the second network device and a second value that corresponds to a second version of the application, and wherein the second version adds less to the version stability score than the first version according to a significance criterion, and
a prediction of a future workload processing capacity of the third network device based on a current workload processing capacity of the third network device and a second stability characteristic of the third network device, wherein the first utilization characteristics describe:
a magnitude of the workload, and
an extent to which the service provided accesses stored service data sequentially.

14. The first device of claim 13, wherein the first stability characteristic is further based on a version of an operating system of the third device.

15. The first device of claim 13, wherein the first stability characteristic is based on a likelihood of a failure of a component of the third device that would affect providing the service by the third device.

16. The first device of claim 13, wherein the first utilization characteristics are based on a group of factors, the group of factors comprising processor utilization and a rate of input output operations.

17. The first device of claim 13, wherein the third device was selected to receive the workload based on the second utilization characteristic indicating that the second device is in an underutilized state.

18. A non-transitory machine-readable medium comprising executable instructions that, when executed by a processor of a first computing device, facilitate performance of operations, the operations comprising:

assigning obtained utilization characteristics to respective ones of a group of linked network devices, wherein a first utilization characteristic of the obtained utilization characteristics is assigned to a first network device and a second utilization characteristic of the obtained utilization characteristics is assigned to a second network device of the group of linked network devices, and wherein the first network device handles a workload to provide a service to a client device served by the first network device;

based on the first utilization characteristic, identifying the first network device as a source network device, wherein the first utilization characteristic describes:
a magnitude of the workload, and
an extent to which the service provided accesses stored service data sequentially;

based on a first value corresponding to a first version of an application that enables the service to be provided by the second network device and a second value that corresponds to a second version of the application, generating a version stability score, wherein the second version adds less to the version stability score than the first version according to a significance criterion; and transferring the workload to the second network device, wherein the second network device was selected as a destination device for the workload based on the second utilization characteristic and a stability characteristic of the second network device, wherein the second network device was selected further based on a prediction, based on a current workload processing capacity of the second network device and the stability characteristic, of a future workload processing capacity of the second network device, wherein the stability characteristic is based on a first value corresponding to a major version of an application that provides the service by the second network device and a second value that corresponds to a minor version of the application.

19. The non-transitory machine-readable medium of claim 18, wherein the first utilization characteristic is analyzed for the workload based on results of analysis of other workloads.

20. The non-transitory machine-readable medium of claim 18, wherein the first utilization characteristic is based on an extent to which the service provided accesses stored service data sequentially.

* * * * *